United States Patent [19]

Lagoni

[11] 4,365,266

[45] Dec. 21, 1982

[54] HORIZONTAL AND VERTICAL IMAGE DETAIL PROCESSING OF A COLOR TELEVISION SIGNAL

[75] Inventor: William A. Lagoni, Indianapolis, Ind.

[73] Assignee: RCA Corporation, New York, N.Y.

[21] Appl. No.: 255,375

[22] Filed: Apr. 20, 1981

[51] Int. Cl.³ .......................................... H04N 9/535
[52] U.S. Cl. ..................................... 358/37; 358/36; 358/31
[58] Field of Search .................. 358/21 R, 31, 32, 36, 358/37, 39, 166, 167

[56] References Cited

U.S. PATENT DOCUMENTS

| | | | |
|---|---|---|---|
| 4,096,516 | 6/1978 | Pritchard | 358/31 |
| 4,223,339 | 9/1980 | Lagoni | 358/31 |
| 4,223,340 | 9/1980 | Bingham | 358/37 |
| 4,295,160 | 10/1981 | Lagoni | 358/31 |

OTHER PUBLICATIONS

RCA Corporation Television Service Data Bulletin, (Technical Publn. C-7, 1980), FIGS. 30 and 32, pp. 38, 39 and 44.

*Primary Examiner*—Michael A. Masinick
*Attorney, Agent, or Firm*—Eugene M. Whitacre; Paul J. Rasmussen; Ronald H. Kurdyla

[57] ABSTRACT

A system for processing the luminance component of a composite video signal in a television receiver is disclosed. The receiver includes a comb filter responsive to the video signal for providing first and second combed output signals from which luminance and chrominance components are respectively derived. A restored luminance signal, comprising signals from the first comb filter output and vertical detail information derived from the second comb filter output, is linearly processed by a network including a horizontal signal peaking circuit. A vertical detail component derived from the second comb filter output is non-linearly processed by a network which generates a vertical detail peaking component. The vertical peaking component is low-pass filtered and then combined with horizontally peaked luminance signals to produce a horizontally and vertically peaked luminance signal, which is afterwards applied to further luminance signal processing circuits of the receiver.

13 Claims, 6 Drawing Figures

HORIZONTAL AND VERTICAL IMAGE DETAIL PROCESSING OF A COLOR TELEVISION SIGNAL

This invention concerns apparatus for enhancing color television signal vertical detail picture information, in a television signal processing system also including apparatus for enhancing horizontal picture detail information.

In a color television system such as the system developed in the United States, the luminance and chrominance components of a color television signal are disposed within the video frequency spectrum in frequency interleaved relation, with the luminance components primarily occurring at integral multiples of the horizontal line scanning frequency and the chrominance components primarily occurring at odd multiples of one-half the line scanning frequency. Current color television receiver designs often employ a comb filter for separating the frequency interleaved luminance and chrominance components of the video signal. Examples of comb filters suitable for this purpose are shown in U.S. Pat. No. 4,143,397—D. D. Holmes and in U.S. Pat. No. 4,096,516—D. H. Pritchard.

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of this unshared band which are subject to such deletion are representative of "vertical detail" luminance information. Preservation of the vertical detail information is desirable to avoid loss of vertical resolution in the luminance content of a displayed image.

One arrangement for preserving the vertical detail information employs a low-pass, vertical detail filter for selectively extracting the vertical detail signal information from the comb filter output that also contains combed chrominance signal. The extracted vertical detail signal is then combined with combed luminance signals from the comb filter. The combined signal includes a "combed" high frequency portion (occupying a band of frequencies above the cut-off frequency of the vertical detail filter) from which chrominance signal components have been removed, and an uncombed (i.e., "flat") low frequency portion in which all luminance signal components have been preserved. In many color television receivers the luminance signal is afterwards processed by a horizontal peaking network to improve the horizontal image detail of an image to be reproduced by the receiver.

An improvement in vertical image detail can be accomplished by suitably processing the extracted vertical detail signal. A signal processing arrangement suitable for this purpose is described in my U.S. Pat. No. 4,245,237 titled "Controllable Non-Linear Processing Of Video Signals." In this system, the extracted vertical detail signal is non-linearly processed to provide a desired amplitude response with respect to selected ranges of vertical detail signal amplitude levels. This vertical detail signal processing system also includes a filter for low-pass filtering the non-linearly processed vertical detail signal, to eliminate certain unwanted visible effects of the non-linear signal processing which may otherwise appear in a displayed image as potentially objectionable serrations along the edge of a displayed diagonal or similar image pattern.

In accordance with the principles of the present invention there is disclosed herein an arrangement of a luminance signal horizontal detail signal processor and a non-linear vertical detail signal processor wherein unwanted interaction between processed horizontal and vertical detail signals is minimized, so that undesirable transient responses in the luminance signal are avoided. In addition, the signal processing characteristics of the horizontal signal processor facilitate the design of the filter response for a low pass filter utilized to filter output signals from the vertical detail signal non-linear processor.

Apparatus according to the present invention is included in a color television receiver for processing a television signal containing image representative luminance and chrominance components disposed within the frequency spectrum of the television signal in frequency interleaved relation. The receiver includes a comb filter with first and second output. A combed luminance appears at the first comb filter output. At the second comb filter output there appears a combed signal including signal frequencies representative of luminance vertical image detail information absent from the combed luminance signal at the first output. A frequency selective network coupled to the second comb filter output selectively passes the signal frequencies corresponding to vertical detail information, exclusive of signal frequencies occupying the band of chrominance signal frequencies, to thereby derive a vertical detail component from the second comb filter output. A restored luminance signal is produced by combining combed luminance signals from the first comb filter output with a given magnitude of the vertical detail component. A first signal translating network responds to the restored luminance signal for peaking horizontal image detail information of the restored luminance signal, to provide a horizontally peaked luminance signal at an output. A second signal translating network responds to the vertical detail component for developing a vertical detail peaking component at an output. Output signals from the first and second translating networks are combined to produce a horizontally and vertically peaked luminance signal, which is then supplied to a luminance signal utilization network.

In accordance with a feature of the invention, the second translating network includes a filter for removing signal frequencies greater than the vertical detail signal frequencies from output signals of the second translating network, the first translating network includes a delay network for determining the peaking characteristics of output signals from the first translating network, and signal delays exhibited by the first and second translating networks are substantially equal.

Figure 1:
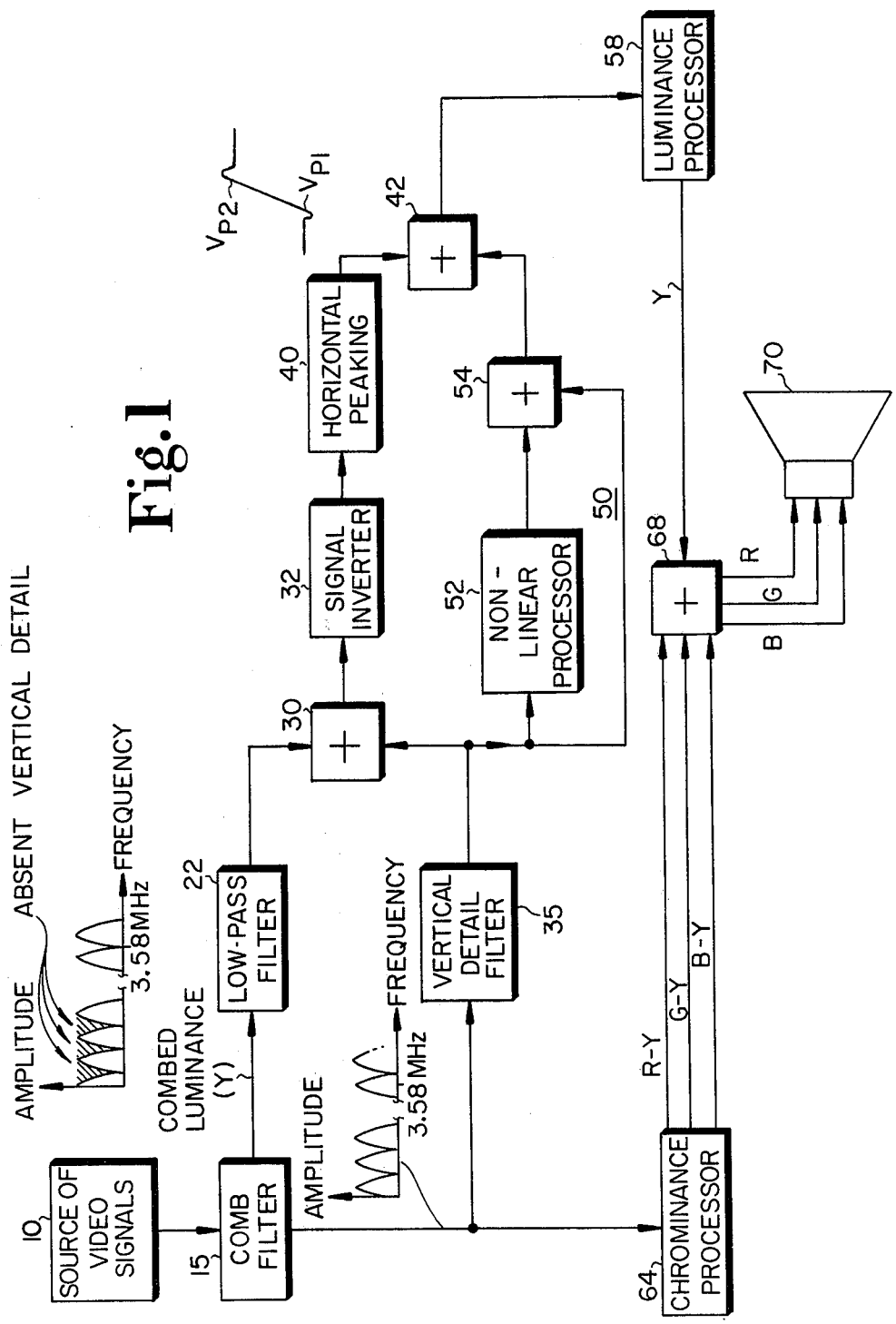
FIG. 1 shows a block diagram of a portion of a color television receiver including signal processing apparatus according to the present invention.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz. which is amplitude and phase modulated with color information. The amplitude versus frequency response of comb filter 15 with respect to luminance combing action exhibits a peak amplitude response at integral multiples of the horizontal line scanning frequency (approximately 15,734 Hz.) extending from D.C. or zero frequency, and an amplitude null at odd multiples of one-half the line scanning frequency, including the 3.58 MHz. chrominance subcarrier frequency. The amplitude versus frequency response of comb filter 15 with respect to chrominance combing action exhibits a peak amplitude response at odd multiples of one-half the line frequency including 3.58 MHz., and an amplitude null at integral multiples of the line frequency.

A "combed" luminance signal (Y) from a first output of comb filter 15 is coupled via a low-pass filter 22 to an input of a signal combining network 30. Filter 22 is arranged to pass all luminance signals below a cut-off frequency of approximately 4 MHz., and serves to remove noise and clock frequency components of switching signals associated with the switching operation of comb filter 15 when of a CCD type comb filter.

A second output of comb filter 15 is applied to a chrominance signal processing unit 64 for generating R-Y, B-Y and G-Y color difference signals, and to an input of a low-pass vertical detail filter 35. Unit 64 includes a suitable filter for passing only those signal frequencies from comb filter 15 which occupy the band of chrominance signal frequencies. Filter 35 exhibits a cut-off frequency of approximately 1.0 MHz., and selectively passes those signal frequencies present in the second signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration is accomplished by combining an appropriate amount of the vertical detail signal from filter 35, with the filtered combed luminance signal from filter 22, in combining network 30. In this regard it is noted that the vertical detail signals from the output of filter 35 exhibit a linear amplitude transfer (gain) response "A" of the form shown in FIG. 3 for both positive (+) and negative (−) signal polarities. The restored luminance signal from the output of combiner 30 is inverted by unit 32, subjected to horizontal detail processing by means of a horizontal peaking control network 40, and afterwards applied to an input of a signal combining network 42.

Vertical detail signals from filter 35 also are supplied to a non-linear vertical detail signal processing circuit 50 including a non-linear signal processor 52 and a signal combiner 54, for imparting different amounts of signal gain to vertical detail signals within three predetermined ranges of signal amplitude as will be discussed. Processed signals from network 50 are supplied to another input of combiner 42, where they are summed with the signals from horizontal peaker 40.

The output signal from combiner 42 corresponds to a reconstituted luminance component of the video signal with the vertical detail information thereof restored, and controllably enhanced (peaked) and pared (attenuated) as will be discussed in connection with FIG. 2. The reconstituted luminance component is afterwards applied to a luminance signal processing unit 58. An amplified luminance signal Y from unit 58 and the color difference signals from chrominance unit 64 are combined in a matrix 68, for providing R, B, and G color image representative output signals. These signals are then suitably coupled to image intensity control electrodes of a color kinescope 70.

Figure 2:
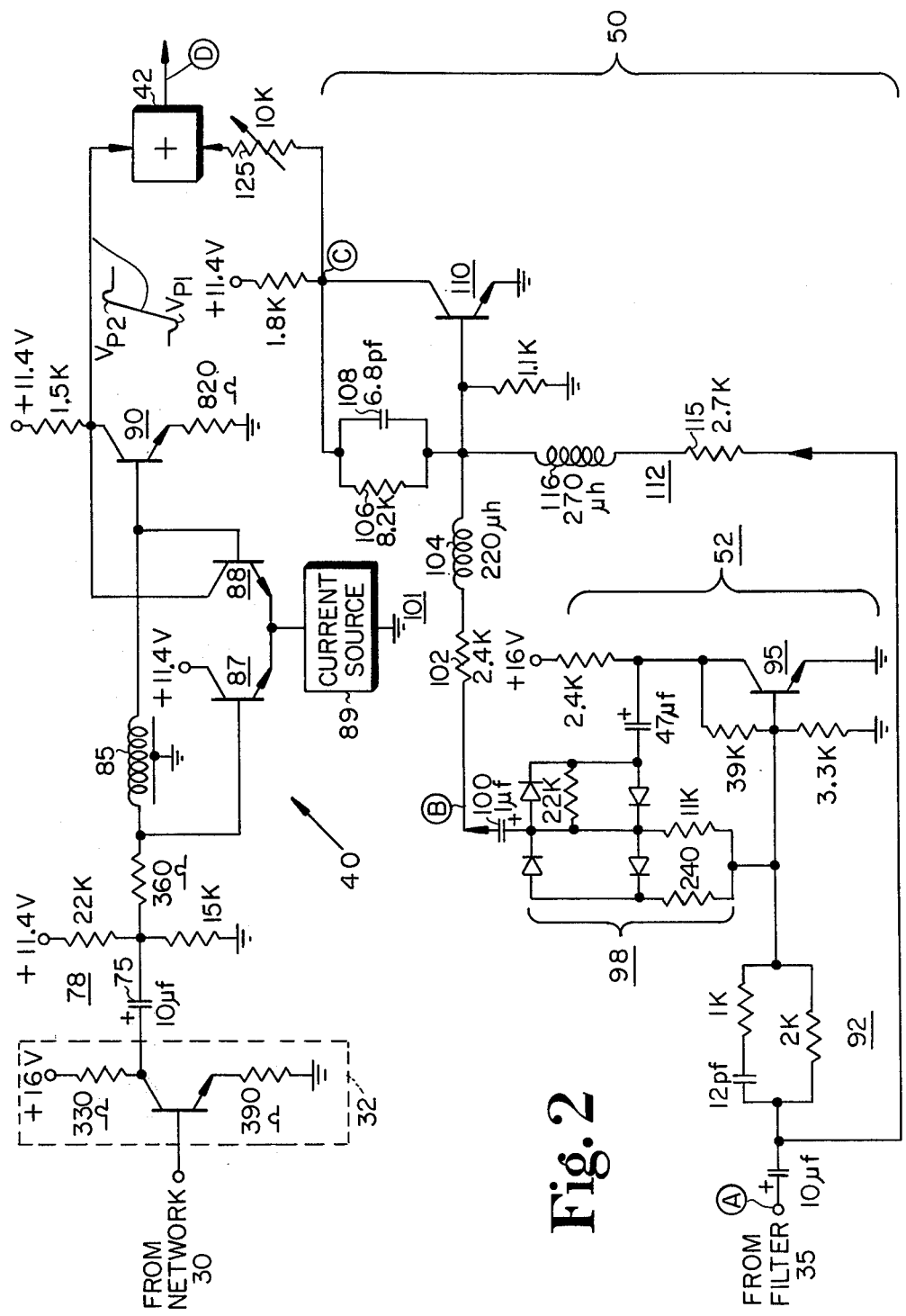
FIG. 2 shows a schematic circuit diagram of signal processing apparatus according to the present invention.

FIG. 2 shows circuit details of the horizontal and vertical detail signal processing networks of FIG. 1.

In FIG. 2, restored combed luminance signals are applied to peaking network 40 from the output of coupling network 30 via signal inverter 32, a coupling capacitor 75, and a resistor network 78. Peaking network 40 includes a delay line 85, differentially connected transistors 87 and 88, a current source 89 for providing operating currents for transistors 87 and 88, and a transistor 90, arranged as shown. In this example delay line 85 operates in a reflective mode and provides a signal delay of approximately 140 nanoseconds. Peaked luminance output signals from network 40 appear at the interconnected collector electrodes of transistors 88 and 90, and are applied to combiner 42. The peaked luminance signals exhibit an increased amplitude transition slope with associated "preshoots" and "overshoots" $V_{p1}$ and $V_{p2}$ for improved horizntal definition and sharpness of a reproduced image. In this example, the bandwidth of network 40 encompasses the zero Hertz to 4.0 MHz. luminance signal bandwidth, with maximum signal peaking being produced at 3.5 MHz. The amount of luminance signal horizontal peaking can be controlled by controlling the level of current available from current source 89. Additional details of peaking network 40 are disclosed in a copending, concurrently filed U.S. patent application of W. E. Harlan titled "Self-Limiting Video Signal Peaking Circuit."

Figure 3:
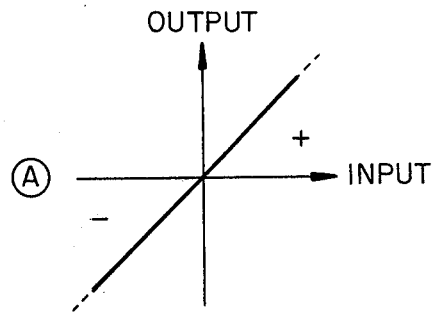
FIGS. 3-6 depict signal transfer responses which are useful in understanding the operation of the signal processing apparatus shown in FIGS. 1 and 2.

Linear vertical detail signals from vertical detail filter 35 (FIG. 1), exhibiting a linear amplitude transfer response "A" as shown in FIG. 3, are coupled via a network 92 to a base input of an amplifier transistor 95 included in non-linear signal processing 52. An amplitude responsive switched feedback network 98 is coupled from the collector electrode to the base electrode of transistor 95. The vertical detail signals are translated with a non-linear amplitude transfer (gain) function by non-linear processor 52, as described in detail in my copending U.S. patent application Ser. No. 190,722 titled "Signal Processing Circuit Having A Non-Linear Transfer Function," now U.S. Pat. No. 4,295,160.

Figure 4:
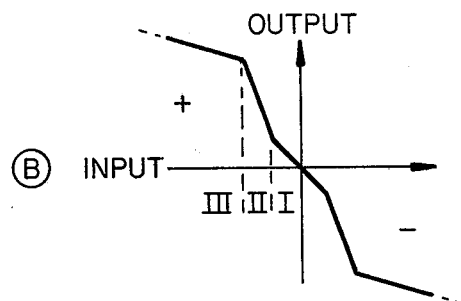

Briefly, non-linear processor 52 manifests a non-linear composite amplitude transfer function as shown in FIG. 4, for imparting different amounts of signal gain to signals having small, moderate and large amplitudes within three ranges respectively designated as I, II, and III in accordance with a transfer function "B" shown in FIG. 4, for both positive (+) and negative (−) signal polarities. Processed vertical detail signals with response "B" are coupled from an output of network 52 via a capacitor 100. Small amplitude vertical detail signals in region I are translated by network 52 with a given fixed gain of approximately two. Small amplitude excursions of moderate amplitude detail signals are also processed with the given fixed gain, while the peak amplitude excursions of moderate amplitude signals are amplified with a gain of approximately three in region II. In region III the peak amplitude excursions of large amplitude signals subject to paring (amplitude reduction) are translated with less than the given fixed gain. Small amplitude excursions of large amplitude signals are processed with the given fixed gain, and moderate amplitude excursions are amplified as mentioned above for region II.

The non-linearly processed signals from processor 52 are coupled via a low-pass vertical peaking filter 101 comprising a resistor 102, an inductor 104, a resistor 106, and a capacitor 108, to a base input of a transistor 110. These signals are combined at the base of transistor 110 with a predetermined amount of linear vertical detail signals from vertical detail filter 35. The latter signals are coupled to the base of transistor 110 via a low-pass filter 112 comprising a resistor 115, an inductor 116, resistor 106 and capacitor 108. Transistor 110 operates as an inverting feedback summing amplifier transistor, and the base electrode of transistor 110 represents a "virtual ground" summing point. Transistor 110 also acts as an active filter device in conjunction with low-pass filters 101 and 112, as will be described in greater detail subsequently.

Figure 5:
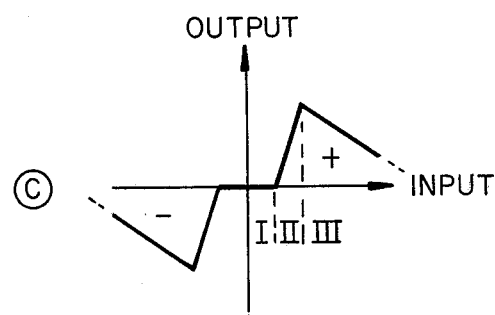

A non-linear amplitude transfer function "C" is associated with signals developed at the collector output of transistor 110, as shown in FIG. 5. Specifically, the characteristics of transfer function C, and the level of signals appearing at the collector of transistor 110, are determined by the ratio of the impedance presented by resistor 106 to the impedance presented by resistor 102, and by the ratio of the impedance presented by resistor 106 to the impedance presented by resistor 115. These impedance ratios are selected so that small amplitude excursions of signals from network 52, after processing in region I of transfer function B (FIG. 4), substantially cancel with small amplitude excursions of signals linearly translated via resistor 115, when signals coupled via resistors 102 and 115 are combined in transistor 110. That is, the linear signal transfer slope in region I of response B and the linear transfer slope associated with response A for signals coupled via resistor 115 mutually cancel in region I so as to produce non-linear transfer function C (FIG. 5) at the collector of transistor 110.

Figure 6:
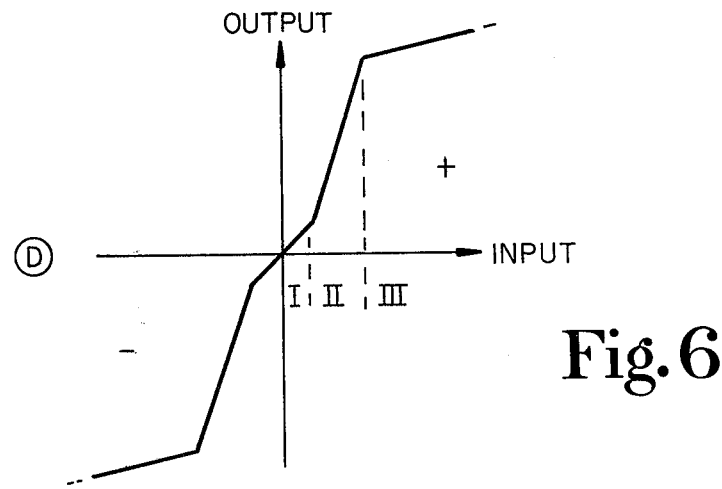

The detail signal developed at the collector output of transistor 110 is coupled via a variable gain control resistance 125 to an input of combiner 42, where the non-linearly processed detail signal from network 50 is summed with the linearly translated luminance signal from horizontal peaking network 40. In this example the signal from peaking network 40 also exhibits a linear (gain) transfer response "A" as shown in FIG. 3. Accordingly, a reconstituted luminance signal appearing at the output of combiner 42 exhibits an amplitude transfer response "D" as shown in FIG. 6. With reference to response "D," it is noted that the signal gain imparted to signals in regions II and III can be varied in accordance with the setting of variable resistance 125, without disrupting the fixed signal gain in region I, as described in detail in my U.S. Pat. No. 4,245,237.

With regard to the output signal from combiner 42, it is noted that the restoration gain produced in restoration region I for low level vertical detail signals (e.g., signal amplitudes of about five percent of maximum expected amplitude) is such that low level vertical detail signals along with noise and other undesired components are processed without enhancement in region I. The peak amplitude of vertical detail signals of moderate amplitude (e.g., signal amplitudes between expected five percent and forty percent of maximum expected amplitude) are processed within enhancement region II to thereby emphasize the vertical detail information and picture definition in this region. The peak amplitude of relatively large amplitude vertical detail signals (e.g., between about forty percent of maximum expected amplitude and maximum amplitude) corresponding to high contrast images such as lettering, for example, are processed within region III to attenuate or pare the large amplitude excursions, which can be large enough to cause excessive contrast and kinescope "blooming" which would otherwise distort or obscure picture detail.

In region I, low level vertical detail signal information has been restored in an amount sufficient to preserve normal low level vertical resolution in the luminance content of a displayed image. The amount of restoration gain in region I preferably corresponds to that amount of signal gain which, in a given system, is required to restore small amplitude excursions of the vertical detail component to the luminance signal so that an ultimately reconstituted luminance signal exhibits an essentially "flat" amplitude response with respect to small amplitude vertical detail signals. The magnitude of the restoration gain is a function of various factors, including the signal translating characteristics of networks coupled between the outputs of comb filter 15 and luminance processor 58 which processes ultimately reconstituted luminance signals, and the relative magnitudes of the signals appearing at the outputs of comb filter 15, for example. The choice of the restoration gain for region I also involves considerations of what results are acceptable in a given video signal processing system. For example, if the restoration gain is insufficient, significant combing effects (i.e., signal peaks and nulls at different frequencies) will appear in the vertical detail frequency region, resulting in less low level vertical detail information. Thus the slope of the amplitude transfer characteristic in region I corresponds to the amount of signal gain necessary to produce a desired response (i.e., a flat luminance response) without introducing unacceptable side effects.

It is noted that in the system as so far described, horizontal peaking is accomplished in a first signal processing path including horizontal peaking network 40, and vertical detail signal processing including peaking is accomplished in a second signal processing path including processor network 50, independent of the horizontal peaking path. Thus the nonlinearly processed vertical detail signals, which are combined in network 42 with signals from horizontal peaker 40, are not subjected to the process of horizontal peaking. This manner of luminance signal processing avoids the introduction of unwanted luminance signal transient responses which would otherwise be produced if the nonlinearly processed vertical detail signals were afterwards subjected to horizontal peaking. Such unwanted transient responses would otherwise be produced due to the different signal processing bandwidths associated with the horizontal and vertical detail signal processing networks. In this example the signal bandwidth of the vertical detail signal processing path extends from zero hertz to approximately 1.0 MHz., while the horizontal peaking signal processing path including network 40 encompasses the significantly wider 4.0 MHz. luminance signal bandwidth as mentioned earlier.

It is also noted that the non-linear operation of vertical detail signal processor 50 sometimes produces rapid amplitude gain transitions of processed signals. Such rapid transitions, which appear as amplitude discontinuities in the time domain, desirably assist to provide a well defined boundary between the operating range wherein vertical detail signals are not peaked, and the operating range wherein detail signals are peaked. However, the discontinuities associated with such rapid transitions can produce an objectionable visible effect upon a displayed image. Specifically, manifestations of the discontinuities appear as serrations or "stairsteps" (i.e., a form of ripple) along the edges of a displayed diagonal or similar image pattern. The image serrations may also be attributable to the content of a received television signal, in which case the serrations may be magnified in effect by the non-linear signal processing operation of network 50. Additional information concerning this phenomenon is found in U.S. Pat. No. 4,223,340 of J. P. Bingham and W. A. Lagoni.

In the arrangement of FIG. 2, the visible impact of these image serrations is reduced to an acceptable minimum by means of low-pass vertical peaking filter 101, including elements 102, 104, 106 and 108, coupled to the output of nonlinear processor circuit 52. This filter serves to smooth or average out the serrations by filtering out high frequency components such as unwanted harmonics and distortion components associated with the rapid signal amplitude transitions attributable to the operation of non-linear processor 52.

The design of vertical peaking filter 101 is facilitated by the manner in which the combed luminance signal processing path including horizontal peaker 40 is arranged relative to the vertical detail signal processing path including non-linear processor 52 and filter 101, as follows.

Proper operation of the signal processing arrangement of FIG. 2 requires that signals coupled via the path including horizontal processor 40, and signals coupled via the vertical detail signal path including vertical processor 52, arrive at combiner 42 in time coincidence so that the reconstituted luminance signal output from combiner 42 exhibits proper amplitude and phase characteristics. This time coincidence is achieved by the signal delay imparted by delay line 85 in the horizontal processor path, in conjunction with the signal delay associated with vertical peaking filter 101 in the vertical processor signal path. In this example the signal delays associated with delay line 85 and vertical peaking filter 101 are substantially equal.

The amount of delay associated with delay line 85 corresponds to the amount of delay (approximately 140 nanoseconds in this example) which is required to determine a desired horizontal peaking response for signals processed by network 40. This amount of delay is sufficiently large so that the corresponding amount of signal (equalizing) delay that is required in the vertical signal processing path including filter 101 is large enough to permit vertical peaking filter 101 to be designed for effective performance relative to desired filtering characteristics. That is, filter 101 is permitted to exhibit a large enough delay so that filter 101 can be designed to exhibit a sufficiently low cut-off frequency of approximately 1.0 MHz. with good rejection of frequencies above 1.0 MHz., as well as a good group phase delay response. Low-pass filter 112 is included to provide signal delay and bandwidth matching for the linear vertical detail signals summed at the base of transistor 110, relative to the signal delay and bandwidth associated with the nonlinearly processed signals from processor 52 and filter 101.

Thus the disclosed arrangement of delay line 85 in horizontal processor 40, relative to vertical processor 52 and vertical peaking filter 101, assists to facilitate the design of an effective vertical peaking filter and provides signal delay equalization, in addition to determining the peaking characteristic of signals processed by horizontal peaker 40 and avoiding the transient response problem noted previously.

Other arrangements of the vertical detail signal processing network are also possible, consistent with the principles of the present invention. Illustratively, vertical detail signal processing circuit 50 could be replaced by the non-linear signal processor shown in FIG. 3 of my previously mentioned copending U.S. patent application Ser. No. 190,722. In this case also it remains desirable to filter the non-linearly processed output signals by means of a filter corresponding to vertical peaking filter 101, for the reasons mentioned previously. The vertical detail signal processing arrangement shown by FIG. 2 herein is advantageous, however, since it permits gain control via adjustable resistor 125 of moderate and large amplitude detail signals in regions II and III, without affecting the fixed gain desired for small amplitude vertical detail signals in region I.

What is claimed is:

1. Video signal processing apparatus in a television receiver system for processing a video signal containing image representative luminance and chrominance components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail information, exclusive of signal frequencies occupying the band of chrominance signal frequencies, to thereby derive a vertical detail component from said second output of said comb filter means;

first means for combining combed luminance signals from said first output of said comb filter means with a given magnitude of said vertical detail component to produce a restored luminance signal;

first signal translating means responsive to said restored luminance signal for peaking horizontal image detail information of said restored luminance signal, to provide a horizontally peaked luminance signal at an output;

second signal translating means responsive to said vertical detail component for developing a vertical detail peaking component at an output;

second means for combining signal outputs from said first and second signal translating means to produce a horizontally and vertically peaked luminance signal at an output; and luminance signal utilization means for receiving output signals from said second combining means.

2. Apparatus according to claim 1, wherein said second translating means includes low-pass filter means for removing signals occupying a band of frequencies above said vertical detail signal frequencies from output signals of said second translating means.

3. Apparatus according to claim 2, wherein said low-pass filter means attenuates signals occupying the band of chrominance signal frequencies.

4. Apparatus according to claim 2, wherein said first translating means includes signal delay means for determining the peaking characteristics of output signals from said first translating means; and wherein said signal delays exhibited by said first and second translating means are substantially equal.

5. Apparatus according to claim 4, wherein said low-pass filter means exhibits a signal delay substantially equal to the signal delay exhibited by said signal delay means.

6. Video signal processing apparatus in a television receiver system for processing a video signal containing image representative luminance and chrominance components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed signal with amplitude peaks at odd multiples of one-half of said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail information, exclusive of signal frequencies occupying the band of chrominance signal frequencies, to thereby derive a vertical detail component from said second output of said comb filter means;

first means for combining combed luminance signals from said first output of said comb filter means with a given magnitude of said vertical detail component to produce a restored luminance signal;

first signal translating means responsive to said restored luminance signal for peaking horizontal image detail information of said restored luminance signal to provide a horizontally peaked luminance signal at an output;

second signal translating means for linearly translating said vertical detail component with a first gain greater than zero;

third signal translating means responsive to said vertical detail component and comprising non-linear processor means having a non-linear signal transfer function for translating small amplitude excursions of said vertical detail component with a second gain greater than zero in a first region, and for translating moderate amplitude excursions of said vertical detail component with a third gain greater than said second gain in a second region;

second means for combining signal outputs from said second and third signal translating means to substantially cancel small amplitude excursions of said vertical detail component;

third means for combining signal outputs from said second combining means and said first signal translating means; and luminance signal utilization means for receiving output signals from said third combining means.

7. Apparatus according to claim 6, wherein said third signal translating means includes low-pass filter means for removing signals occupying the band of frequencies above said vertical detail frequencies from output signals of said third translating means.

8. Apparatus according to claim 7, wherein said second signal translating means includes signal delay means exhibiting a signal delay substantially equal to a signal delay exhibited by said third signal translating means.

9. Apparatus according to claim 8, wherein said signal delay means included in said second signal translating means comprises a low-pass filter.

10. Apparatus according to claim 7, wherein said first signal translating means includes signal delay means for determining the peaking characteristics of output signals provided by said first signal translating means; and wherein signal delays exhibited by said first and third signal translating means are substantially equal.

11. Apparatus according to claim 10, wherein said signal delay means exhibits a signal delay substantially equal in magnitude to a signal delay exhibited by said low-pass filter means.

12. Apparatus according to claim 10, wherein said low-pass filter means attenuates signals occupying the band of chrominance signal frequencies.

13. Apparatus according to claim 6, and further comprising a variable impedance coupled to said second combining means for varying the magnitude of output signals from said second combining means.

* * * * *